United States Patent
Hama et al.

(10) Patent No.: US 8,742,721 B2
(45) Date of Patent: Jun. 3, 2014

(54) BATTERY CHARGING WAREHOUSE

(75) Inventors: Manabu Hama, Aichi-ken (JP); Mitsutaka Shibagaki, Aichi-ken (JP); Takanori Imai, Aichi-ken (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 495 days.

(21) Appl. No.: 13/045,879

(22) Filed: Mar. 11, 2011

(65) Prior Publication Data

US 2011/0227526 A1    Sep. 22, 2011

(30) Foreign Application Priority Data

Mar. 16, 2010   (JP) ................................. 2010-059417

(51) Int. Cl.
    *H01M 10/46*   (2006.01)
(52) U.S. Cl.
    USPC ......................................... 320/116; 414/168
(58) Field of Classification Search
    USPC .......... 320/107, 109, 115, 116; 414/266, 268, 414/269, 277, 281, 286; 104/34
    See application file for complete search history.

(56) References Cited

U.S. PATENT DOCUMENTS

| 6,157,162 A | * | 12/2000 | Hayashi et al. | 320/104 |
| 2008/0053716 A1 | * | 3/2008 | Scheucher | 180/2.1 |
| 2010/0102775 A1 | * | 4/2010 | Chander et al. | 320/109 |

FOREIGN PATENT DOCUMENTS

| JP | 61-010920 A | | 1/1986 |
| JP | 63-228902 A | | 9/1988 |
| JP | 2009-050076 A | | 3/2009 |
| JP | 2009050076 A | * | 3/2009 |
| JP | 2010-108714 A | | 5/2010 |

* cited by examiner

*Primary Examiner* — Edward Tso
(74) *Attorney, Agent, or Firm* — Sughrue Mion, PLLC

(57) ABSTRACT

The battery charging warehouse includes a pallet rack and a battery charger. The pallet rack has a plurality of storage locations in each of which a battery is stored. At least one of the storage locations is a charging storage location in which the battery is charged. The battery charger is mounted to an upper part of the charging storage location. The battery charger is movable up and down in the charging storage location and has a charge connector. When the battery charger is moved down in the charging storage location, the charge connector is received by a battery connector of the battery stored in the charging storage location thereby to automatically connect the charge connector to the battery connector.

11 Claims, 3 Drawing Sheets

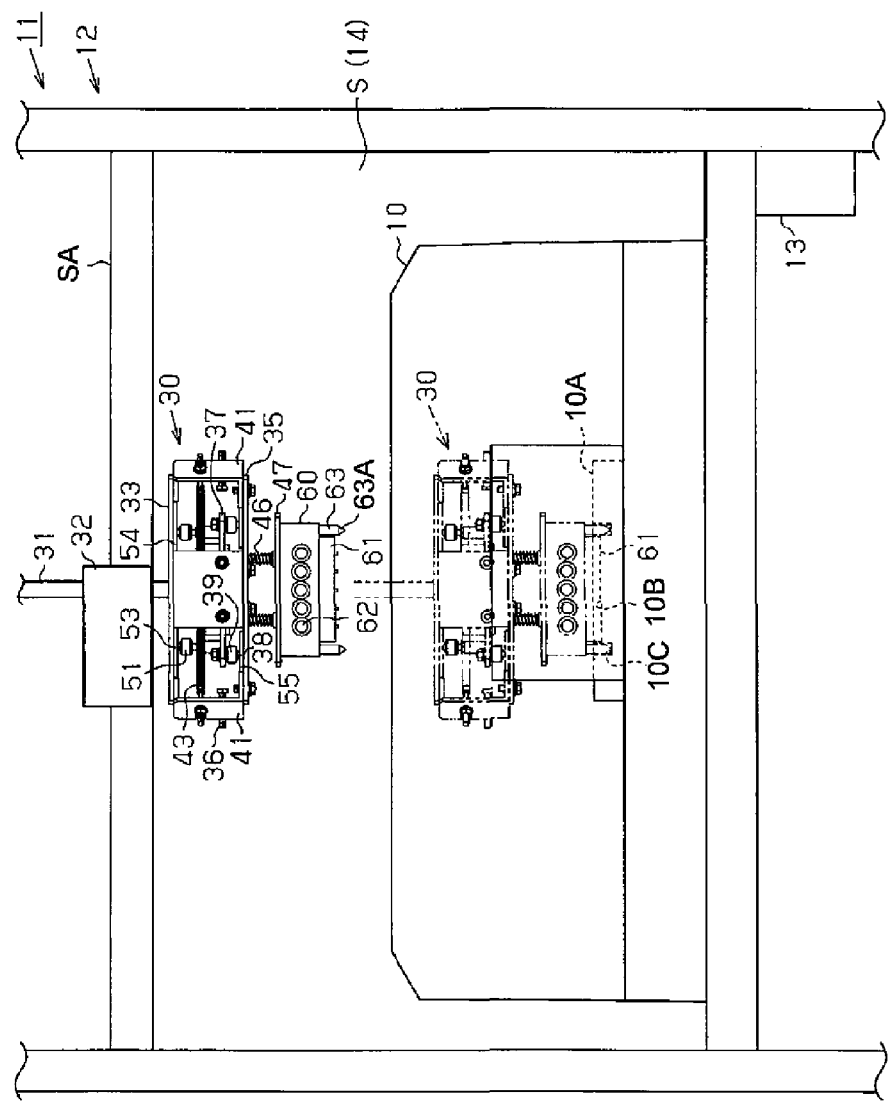

BATTERY CHARGING WAREHOUSE

BACKGROUND OF THE INVENTION

The present invention relates to a battery charging warehouse.

A warehouse as a battery charging system is disclosed by Japanese Patent Application Publication No. 2009-50076. This charging system has a pallet rack including a plurality of shelves for holding cool boxes and some of the shelves are used as charging shelves for holding the cool boxes in charging built-in batteries of the cool boxes. Each charging shelf has at the bottom thereof a power feeding plug that is connected to an inlet socket of the cool box via a charging attachment. In addition, the charging system has a stacker crane that moves the cool box to the shelves (or storage shelves) other than the charging shelves after the battery charging for the cool box in the charging shelf is complete. The stacker crane has a lifting carriage with a slide fork that moves into and out of the charging shelves and the storage shelves.

To charge the built-in battery of the cool box, the stacker crane is moved with the cool box held on the lifting carriage and the lifting carriage is moved to the level of the charging shelf. Then, the slide fork is extended into the charging shelf to move the cool box into the charging shelf. When the cool box is placed on the charging shelf, the power feeding plug is connected to the inlet socket via the charging attachment thereby to charge the built-in battery of the cool box.

To move the cool box whose battery has been charged into the storage shelf, the lifting carriage is moved to the level of the charging shelf. Then, the slide fork is extended into the charging shelf to lift the cool box and moved from the charging shelf back to the retracted position. Thus, the cool box is moved to the storage shelf by the movement of the lifting carriage and the stacker crane.

In the charging system of the above-cited Japanese Patent Application Publication No. 2009-50076 wherein the power feeding plug is located at the bottom (lower part) of the charging shelf, however, the cool box needs to be moved to the charging shelf in connecting the power feeding plug and the charging attachment to each other so that the charging attachment is located above the power feeding plug. Therefore, it is necessary to control the driving of the slide fork accurately, which makes it difficult to connect the power feeding plug and the charging attachment.

The present invention, which has been made in view of the above-described problems, is directed to a battery charging warehouse that permits automatic and easy connection of a charge connector to a battery connector.

SUMMARY OF THE INVENTION

In accordance with an aspect of the present invention, the battery charging warehouse includes a pallet rack and a battery charger. The pallet rack has a plurality of storage locations in each of which a battery is stored. At least one of the storage locations is a charging storage location in which the battery is charged. The battery charger is mounted to an upper part of the charging storage location. The battery charger is movable up and down in the charging storage location and has a charge connector. When the battery charger is moved down in the charging storage location, the charge connector is received by a battery connector of the battery stored in the charging storage location thereby to automatically connect the charge connector to the battery connector.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

Figure 1:
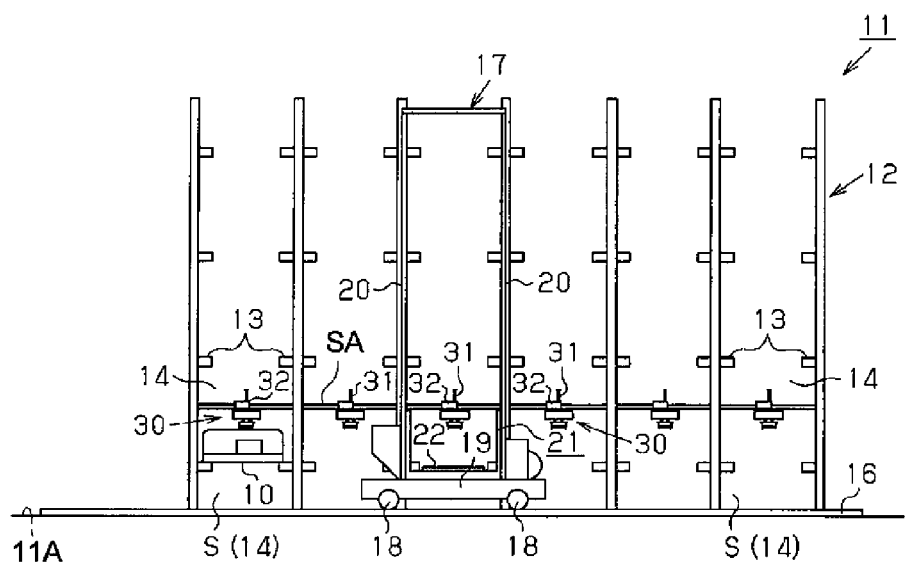
FIG. 1 is a schematic view showing a battery-charging automated warehouse according to an embodiment of the present invention.
Figure 2:
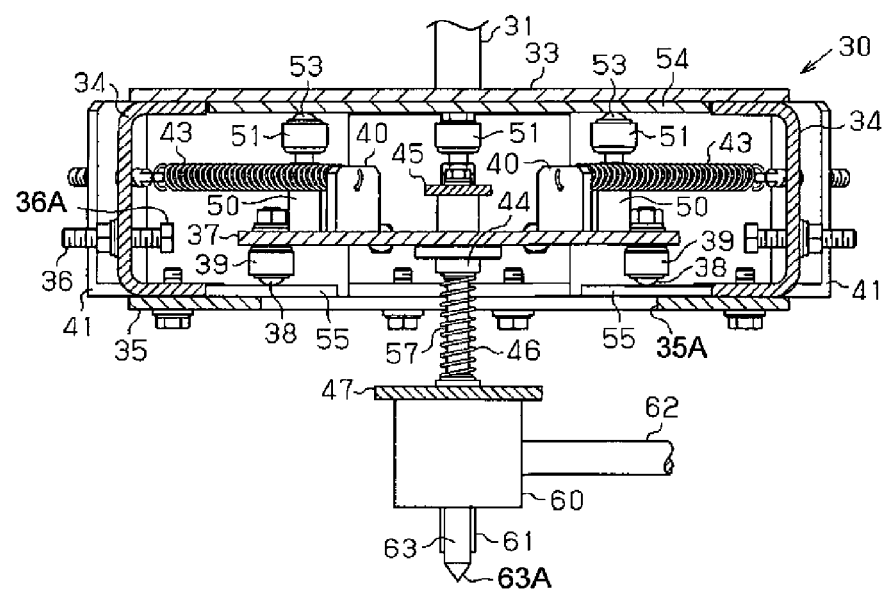
Figure 3:
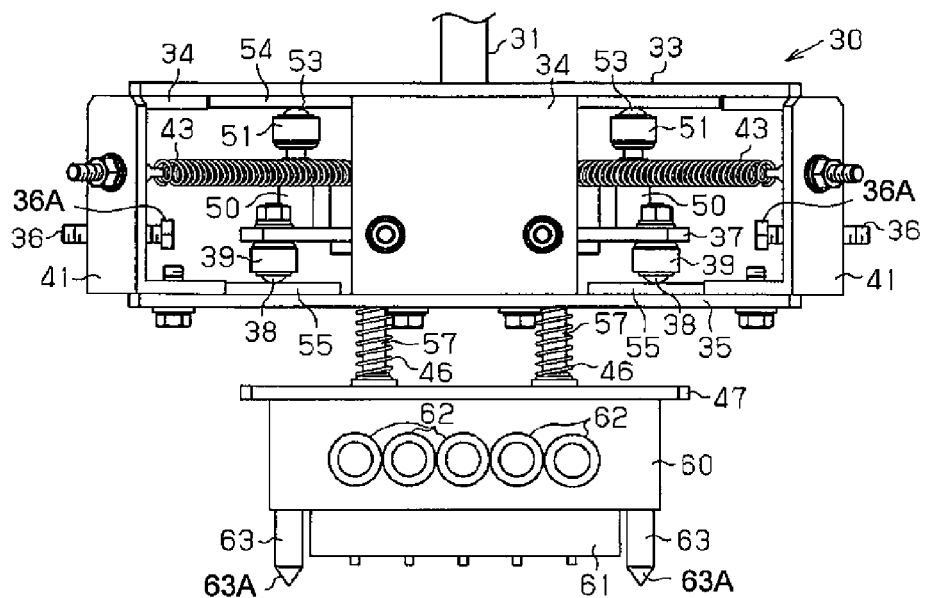
Figure 4:
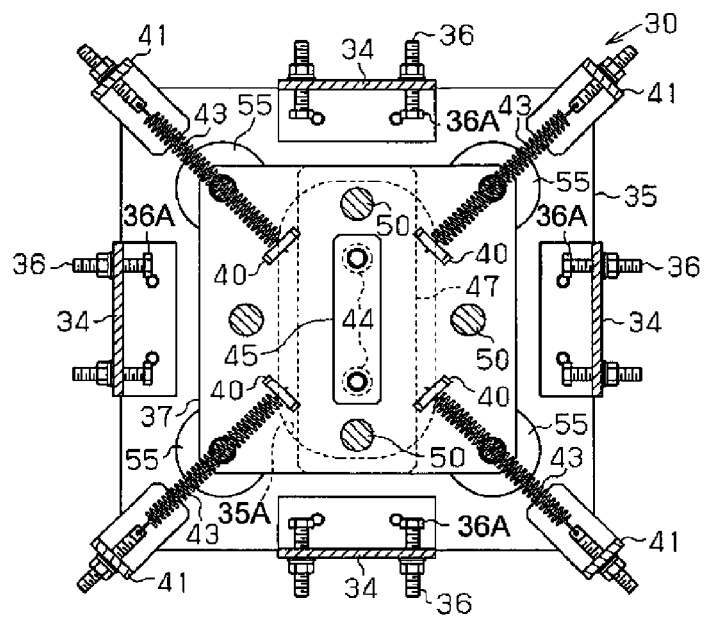

to FIG. 2 is a partially sectional side view showing a battery charger of the battery-charging automated warehouse of FIG. 1;

FIG. 3 is a side view showing the battery charger of FIG. 2;

FIG. 4 is a partially sectional plan view showing the battery charger of FIG. 2; and FIG. 5 is a view showing the connection between a male connector of the battery charger and a female connector of a battery.

DETAILED DESCRIPTION OF THE EMBODIMENTS

The following will describe an embodiment of the battery charging warehouse according to the present invention as applied to an automated warehouse for charging the battery of an electric car with reference to FIGS. 1 through 5. Referring to FIG. 1 showing a battery-charging automated warehouse 11, it includes an aisle 11A and a pallet rack 12 disposed along the aisle 11A. The rack 12 has a plurality of storage locations 14 arranged in both the direction along the aisle 11A and the direction along the height of the rack 12. Each storage location 14 is formed by a pair of shelves 13. In the present embodiment, all the storage locations 14 at the bottom stair of the rack 12 are the charging storage locations S in each of which a battery 10 is charged. The battery 10 is held on the paired shelves 13 and stored in the charging storage locations S.

Referring to FIG. 5 showing the battery 10 stored in the charging storage location S, the battery 10 has therein a recess that recedes from the top of the battery 10 downward and that extends in width direction of the battery 10, and a battery electrode 10A is disposed in the recess. An elongated female connector 10B is formed in the battery electrode 10A so as to extend inwardly and serves as the battery connector of the present invention. The female connector 10B extends in the width direction of the battery 10. The battery 10 has therein at opposite positions of the female connector 10B a pair of positioning holes 10C.

Referring back to FIG. 1, the aisle 11A of the automated warehouse 11 has therein a pair of traveling guide rails 16 which extend in the longitudinal direction of the aisle 11A and on which a stacker crane 17 is movably arranged. The stacker crane 17 has a carriage 19 with a pair of front and rear rotatable wheels 18 freely running on the traveling guide rails 16, a pair of masts 20 extending upward from the carriage 19, and a lifting carriage 21 disposed between the paired masts 20 and movable up and down. The lifting carriage 21 has at the bottom thereof a slide fork 22. The slide fork 22 is horizontally movable for moving the battery 10 into and out of the charging storage location S.

Each charging storage location S of the rack 12 has at the upper part thereof a support wall SA to which a battery charger 30 is mounted via a ball screw 31. The support wall SA supports one end or upper end of the ball screw 31 via ball nut (not shown). As shown in FIG. 5, the ball screw 31 is moved up and down via the ball nut by the drive force of a lifting motor 32 mounted on the support wall SA. That is, when the lifting motor 32 is rotated in the forward direction, the ball screw 31 is lowered without rotation. When the lifting motor 32 is rotated in the reverse rotation, the ball screw 31 is lifted without rotation. The battery charger 30 is mounted to the lower end of the ball screw 31.

The following will describe the battery charger 30 in detail. Referring to FIGS. 2 and 3, the battery charger 30 has a first support plate 33 and a first plate 54 which are fixed to the lower end of the ball screw 31 with the first support plate 33 placed on the first plate 54. The first support plate 33 is formed of a square plate and the first plate 54 is also formed of a square plate, but smaller than the first support plate 33. The first plate 54 has four edges that are located inward of four edges of the first support plate 33. Four connecting members 34 each having a U shape are joined at the upper ends thereof to the bottoms of the four edges of the first support plate 33. A second support plate 35 is joined to the lower ends of the lour connecting members 34. The second support plate 35 has therethrough at the center thereof an elongated hole 35A. That is, the first support plate 33 and the second support plate 35 are spaced in facing relation to each other by the four connecting members 34. The first support plate 33, the four connecting members 34 and the second support plate 35 are integrated.

Referring to FIG. 4 showing the battery charger 30, a pair of bolts 36 is screwed through each connecting member 34 so as to extend parallel to the first support plate 33 and the second support plate 35 with the head 36A of each bolt 36 located in between the first support plate 33 and the second support plate 35. Each head 36A of the bolt 36 serves as a stop.

Four second plates 55 each having a disc shape are fixed to the second support plate 35 so as to surround the elongated hole 35A. Referring to FIG. 2, a first mounting plate 37 formed of a square plate is located above the second support plate 35 and supported via four second rolling balls 38. The first mounting plate 37 serves as the mounting of the present invention and the second rolling balls 38 serve as the rolling element of the present invention. Four second housings 39 each having a cylindrical shape are joined to the bottoms of the first mounting plate 37 at the four corners thereof and house therein the second rolling balls 38 so as to freely roll, respectively. The second rolling balls 38 are in contact with and supported by the second plates 55 fixed to the second support plate 35 so as to freely roll on the second plates 55, respectively.

Four support pillars 50 extend upward from the top of the first mounting plate 37 and have thereon four first housings 51, respectively. Each first housing 51 houses therein a first rolling ball 53 so as to allow the first rolling ball 53 to freely roll in the first housing 51. The first rolling balls 53 are in contact with the bottom of the first plate 54. The first rolling balls 53 serve as the rolling element of the present invention.

The first mounting plate 37 is supported in parallel disposition with respect to the second support plate 35 and the first support plate 33 with the second rolling balls 38 in contact with the second plates 55 and the first rolling balls 53 in contact with the first plate 54. In addition, rolling motion of the first rolling balls 53 and the second rolling balls 38 allows the first mounting plate 37 to move in all horizontal (or lateral) directions while keeping the parallel relation to the first support plate 33 and the second support plate 35. The movement of the first mounting plate 37 is regulated by the bolt head 36A of the bolt 36 that serves as the stop.

Referring to FIG. 4, four first spring mounting plates 40 are joined to the top of the first mounting plate 37 at positions in the diagonals of the first mounting plate 37 of a square shape. Four second spring mounting plates 41 each having an L shape are joined at the horizontal bottom thereof to the top of the four corners of the second support plate 35 and the vertical portion of the second spring mounting plates 41 extends upward from the second support plate 35. A return spring 43 is disposed between each first spring mounting plate 40 and its corresponding second spring mounting plate 41. The return spring 43 is provided by a tension spring (coil spring). Specifically, the return spring 43 is disposed with one end thereof hooked on the first spring mounting plate 40 and the other end thereof hooked on the second spring mounting plate 41. The urging force of the four return springs 43 acts to urge the first mounting plate 37 diagonally outward via the first spring mounting plates 40, so that the first mourning plate 37 is located at the center of the second support plate 35. The position of the first mounting plate 37 where it is thus located at the center will be referred to as the initial position of the first mounting plate 37.

As shown in FIG. 2, the first mounting plate 37 has at positions adjacent to the center on the bottom thereof a pair of bushings 44. The paired bushings 44 are spaced in the longitudinal direction of the elongated hole 35A. A connecting rod 57 extends through the first mounting plate 37 and each bushing 44 and is connected at the upper end thereof to a connecting plate 45. Each connecting rod 57 is supported by the bushing 44 so as to be linearly movable up and down without rotation.

A second mounting plate 47 having a rectangular shape is joined to the lower ends of the respective connecting rods 57. A thrust adjusting spring 46 is interposed between the lower end surface of each bushing 44 and the top of the second mounting plate 47, and the connecting rod 57 extends through the thrust adjusting spring 46, as shown in FIG. 2. The second mounting plate 47 is supported by the first mounting plate 37 via the bushings 44, the connecting rods 57 and the thrust adjusting springs 46 so as to depend from the first mounting plate 37.

A charge electrode 60 is mounted to and supported by the second mounting plate 47. The connecting plate 45, the connecting rods 57, the second mounting plate 47 and the charge electrode 60 are integrated, so that the second mounting plate 47 is moved up and down and the connecting rods 57 are moved up and down relative to the first mounting plate 37 with the up and down movement of the charge electrode 60.

A male connector 61, which serves as the charge connector of the present invention, extends downward from the charge electrode 60. Since the charge electrode 60 is mounted to and supported by the first mounting plate 37 via the connecting rods 57 and the second mounting plate 47, the male connector 61 is also supported by the first mounting plate 37. The male connector 61 is insertable into the female connector 10B of the battery 10 for connection therewith. A plurality of conductors 62 is connected at one end thereof to the charge electrode 60 and at the other end thereof to a battery charger (not shown). As shown in FIG. 3, two positioning pins 63 are provided at the opposite longitudinal ends of the charge electrode 60, extending downward from the charge electrode 60. Each positioning pin 63 has an end 63A that is tapered. As clearly shown in FIG. 3, the ends 63A of the positioning pins 63 are located lower than the bottom end of the male connector 61. Therefore, the ends 63A of the positioning pins 63 are insertable into the positioning holes 10C of the battery 10 before the male connector 61 is inserted into the female connector 10B of the battery 10. The charge electrode 60 depends from and is supported by the first mounting plate 37 via the bushings 44, the thrust adjusting springs 46 and the second mounting plate 47.

In the above-described battery charger 30, when the lifting motor 32 is rotated in the forward direction to lower the ball screw 31, the male connector 61 of the charge electrode 60 is also lowered. When the lifting motor 32 is rotated in the reverse direction to lift the ball screw 31, the male connector 61 of the charge electrode 60 is also lifted. Thus, the ball screw 31, the ball nut, the lifting motor 32 cooperate to form means for lifting and lowering the battery charger 30.

In the battery charger 30, the first mounting plate 37 is urged by the urging force of the four return springs 43 to be located at the center of the second support plate 35, as shown in FIG. 4. Therefore, the male connector 61 of the charge electrode 60, which depends from the first mounting plate 37, is urged to be located at the center of the second support plate 35 or at the initial position by the urging force of the four return springs 43.

In the battery charger 30, the first mounting plate 37 is movable in all horizontal directions by the first rolling balls 53 and the second rolling balls 38, as shown in FIG. 2, while being urged by the four return springs 43. Therefore, the male connector 61 of the charge electrode 60, which depends from and is supported by the first mounting plate 37, is also movable in all horizontal (or lateral) directions (360 degrees) and is allowed to automatically return to the initial position by the urging force of the return springs 43.

In the battery charger 30, the male connector 61 of the charge electrode 60 is movable closer to the second support plate 35 by the compression of the two thrust adjusting springs 46 and is allowed to automatically return to its initial position by the return of the two thrust adjusting springs 46 from its compression state.

The following will describe the method of connecting the male connector 61 of the charge electrode 60 and the female connector 10B of the battery 10 by the battery charger 30. For the sake of the description, it is assumed that the male connector 61 of the charge electrode 60 is misaligned with respect to the female connector 10B of the battery 10 in any of front, rear, right and left directions.

When the lifting motor 32 is rotated in the forward direction to lower the ball screw 31, the male connector 61 of the charge electrode 60 is also lowered. Firstly, the ends 63A of the positioning pins 63 are inserted into the positioning holes 10C of the battery 10 before the male connector 61 is inserted into the female connector 10B. Although the axes of the positioning pins 63 are misaligned with the center of the respective positioning holes 10C, the ends 63A are inserted into the positioning holes 10C because the ends 63A of the positioning pins 63 are tapered. As the peripheral surfaces of the ends 63A are moved in sliding contact with the inner surfaces of the positioning holes 10C, the misaligned male connector 61 is urged to move toward the female connector 10B due to the tapered configuration of the ends 63A of the positioning pins 63.

Since the first mounting plate 37, which supports the charge electrode 60, is movable in all horizontal directions by the rolling motion of the first rolling balls 53 and the second rolling balls 38, the first mounting plate 37 is moved in the direction in which the first mounting plate 37 is urged, so that the male connector 61 is automatically moved toward the female connector 10B. That is, the male connector 61 is automatically aligned with the female connector 10B so as to be insertable into the female connector 10B. Thus, the positioning pins 63, the first rolling balls 53 and the second rolling balls 38 cooperate to form the mechanism for aligning the male connector 61 of the charge electrode 60 with the female connector 10B of the battery 10, or the alignment mechanism of the present invention. The four return springs 43 are compressed or extended when the male connector 61 is automatically aligned with the female connector 10B so as to be insertable into the female connector 10B.

As the charge electrode 60 is lowered further, the aligned male connector 61 is inserted into the female connector 10B and finally connected thereto, as shown in FIG. 5. Although the male connector 61 is pressed against the female connector 10B by the thrust force due to the downward movement of the charge electrode 60 when the male connector 61 is being connected to the female connector 10B, such thrust force is absorbed (adjusted) by the compression of the thrust adjusting springs 46. Then, electric power is supplied from the battery charger to the battery 10 via the conductors 62 thereby to charge the battery 10.

After the battery charging is complete, the lifting motor 32 is rotated in the reverse direction to lift the ball screw 31 and the male connector 61 of the charge electrode 60 is lifted, accordingly. Since the positioning pins 63 are then moved in sliding contact with the inner surfaces of the positioning holes 10C, the charge electrode 60 is lifted with the male connector 61 aligned with the female connector 10B.

When the positioning pins 63 are moved out of the positioning holes 10C, the return springs 43 compressed or extended for aligning the male connector 61 return to their original shape because the first mounting plate 37 is urged by the four return springs 43. Since the first mounting plate 37 is movable in all horizontal directions by the rolling motion of the first rolling balls 53 and the second rolling balls 38, the first mounting plate 37 is moved in the direction in which the first mounting plate 37 is urged by the four return springs 43. Therefore, the first mounting plate 37 returns to the initial position, and the male connector 61 of the charge electrode 60, which is supported by the first mounting plate 37, automatically returns to its initial position, accordingly. Thus, the four return springs 43 form the mechanism for returning the male connector 61 to its initial position, or the initial position return mechanism of the present invention.

The above-described embodiment offers the following advantageous effects.

(1) The battery-charging automated warehouse 11 includes the battery charger 30 that is mounted to the upper part (or the support wall SA) of the charging storage location S so as to be movable up and down in the charging storage location S. The battery charger 30 has the male connector 61 that is insertable into or received by the female connector 10B of the battery 10 stored in the charging storage location S for connection with the battery 10. When the battery charger 30 is lowered from a position above the battery 10, the male connector 61 is automatically connected to the female connector 10B. Thus, it is unnecessary to move the battery 10 to connect the male connector 61 and the female connector 10B. In addition, it is unnecessary to accurately control the driving of the slide fork 22 moving the battery 10 to make such connection. Thus, the connection between the male connector 61 and the female connector 10B is automatically and easily made.

(2) When the battery charger 30 is lowered from a position above the battery 10, the male connector 61 is automatically connected to the female connector 10B. Thus, it is unnecessary to move the battery 10 as a heavy load to connect the male connector 61 and the female connector 10B. Thus, the connection between the male connector 61 and the female connector 10B is easily made.

(3) The battery charger 30 has the alignment mechanism, which moves the male connector 61 horizontally (or laterally) thereby to align the male connector 61 with the female connector 10B. Therefore, if the male connector 61 is misaligned with the female connector 10B, the alignment mechanism automatically aligns the male connector 61 with the female connector 10B thereby to connect the male connector 61 and the female connector 10B.

(4) The alignment mechanism has the positioning pins 63 that are insertable into the positioning holes 10C of the battery 10, the first rolling balls 53 and the second rolling balls 38 that allow the movement of the male connector 61. When the male connector 61 is urged toward the female connector 10B by the insertion of each positioning pin 63 into its corresponding positioning hole 10C, the movement of the male connector 61 is allowed by the rolling motion of the first rolling balls 53 and the second rolling balls 38. Thus, the alignment of the male connector 61 with the female connector 10B is accomplished by such a simple structure.

(5) The charge electrode 60 having the male connector 61 is mounted to and supported by the square first mounting plate 37, which is urged diagonally of the first mounting plate 37 by the return springs 43. When the male connector is removed from the female connector 10B, the return springs 43 automatically return the male connector 61 to its initial position. Compared to the case where the male connector 61 aligned with the female connector 10B is manually returned to the initial position after removed from the female connector 10B, the present embodiment permits the male connector 61 to be returned to the initial position easily.

(6) The initial position return mechanism, which returns the male connector 61 to its initial position, accomplishes its function by using the four return springs 43 each formed by a coil spring. Thus, the returning function of the above mechanism can be accomplished by such a simple structure.

(7) The charge electrode 60 having the male connector 61 is connected to the second mounting plate 47 via the connecting rods 57. In addition, each connecting rod 57 is supported by the bushing 44 so as to be movable relative to the first mounting plate 37 and the thrust adjusting spring 46 is interposed between each bushing 44 and the second mounting plate 47. Although the male connector 61 is pressed against the female connector 10B by the thrust force due to the downward movement of the charge electrode 60 in connecting the male connector 61 to the female connector 10B, such thrust force is absorbed (adjusted) by the compression of the thrust adjusting spring 46. Therefore, pressing the male connector 61 excessively against the female connector 10B is prevented.

(8) The battery-charging automated warehouse 11 has the charging storage locations 14 at the bottom stair of the storage locations 14 of the pallet rack 12. By placing the battery 10 in the charging storage location S, charging of the battery 10 is completed while the battery 10 is stored in the rack 12.

(9) In the battery-charging automated warehouse 11 having the charging storage locations 14 at the bottom stair of the storage locations 14 of the pallet rack 12, the space for the battery-charging automated warehouse 11 may be reduced as compared to a case where the battery charger of the battery 10 is disposed outside the rack 12.

(10) The battery-charging automated warehouse 11 has the charging storage locations 14 at the bottom stair of the storage locations 14 of the pallet rack 12, and the lifting carriage 21 of the stacker crane 17 in the warehouse 11 is operable to move the battery 10 into and out of the charging storage location S. Therefore, unlike a case where the battery charger of the battery 10 is distanced from the rack 12, the workman in the warehouse 11 need not move the battery 10.

(11) The charging storage locations S are located at the bottom stair of the storage locations 14 of the pallet rack 12. Thus, the battery charger 30 and the battery 10 disposed in the charging storage location S are protected from rainwater.

The present invention has been described in the context of the above first embodiment, but it is not limited to the embodiment. It is obvious to those skilled in the art that the invention may be practiced in various manners as exemplified below.

The initial position return mechanism may include only three return springs 43. Alternatively, it may have more than four return springs 43.

Although the return springs 43 as the initial position return mechanism are provided by tension springs, compression springs may be used.

The first rolling balls 53 and the second rolling balls 38 as the rolling element of the alignment mechanism may be replaced by any other suitable rolling element such as rollers or, casters that are rotatably supported at the bottom of the first mounting plate 37.

The storage locations 14 of the rack 12 may have only a single charging storage location S.

The charging storage location S may be located at any stair of the storage locations 14 of the pallet rack 12 other than the bottom.

Although in the above-described embodiment the battery charging warehouse of the present invention is applied to an automated warehouse for charging a battery of an electric car, it may be applied to a warehouse for charging a battery of a vehicle other than electric car.

What is claimed is:

1. A battery charging warehouse comprising:
a pallet rack having a plurality of storage locations in each of which a battery is stored, at least one of the storage locations being a charging storage location in which the battery is charged; and
a battery charger mounted to an upper part of the charging storage location, the battery charger being movable up and down in the charging storage location and having a charge connector, wherein
when the battery charger is moved down in the charging storage location, the charge connector is received by a battery connector of the battery stored in the charging storage location thereby to automatically connect the charge connector to the battery connector.

2. The battery charging warehouse according to claim 1, wherein the battery charger has therein a laterally movable mounting that supports the charge connector, the battery charger having an alignment mechanism that moves the charge connector laterally thereby to align the charge connector with the battery connector.

3. The battery charging warehouse according to claim 2, wherein the alignment mechanism has a positioning pin and a rolling element, the positioning pin being insertable into a positioning hole of the battery, the rolling element being mounted to the mounting so as to freely roll on the mounting for allowing the movement of the charge connector in accordance with the insertion of the positioning pin into the positioning hole.

4. The battery charging warehouse according to claim 2, wherein the battery charger has an initial position return mechanism for returning the charge connector to an initial position thereof.

5. The battery charging warehouse according to claim 4, wherein the initial position return mechanism has a plurality of coil springs for urging the charge connector to be located at the initial position.

6. The battery charging warehouse according to claim 1, wherein the charge connector is a male connector and the battery connector is a female connector, wherein when the battery charger is moved down in the charging storage location, the male connector is inserted into the female connector of the battery stored in the charging storage location thereby to automatically connect the male connector to the female connector.

7. The battery charging warehouse according to claim 1, wherein the charging storage location of the pallet rack has at the upper part thereof a support wall to which the battery charger is mounted via a ball screw.

8. An apparatus comprising:
   a rack including a first storage location and a charging storage location, the charging storage location being a location in which a battery stored therein is charged, the battery having a battery connector that is accessible from a certain portion thereof; and
   a battery charger mounted to an upper part of the charging storage location, the battery charger being movable up and down in the charging storage location and having a charge connector, wherein
   the battery charger is moved downward toward the certain portion of the battery in order to connect the charge connector to the battery connector.

9. The apparatus according to claim 8, wherein the battery charger includes:
   a laterally movable mounting that supports the charge connector; and
   an alignment mechanism that moves the charge connector laterally thereby to align the charge connector with the battery connector.

10. An apparatus comprising:
    a rack including a charging storage location that includes a battery disposed therein, the battery having a battery connector; and
    a battery charger mounted to a surface of the charging storage location and including a charge connector configured to connect to the battery connector, the battery charger being movable along a certain direction that is orthogonal to the surface of the charging storage location upon which the battery charger is mounted, wherein
    the battery charger is moved along the certain direction toward the battery connector in order to connect the charge connector to the battery connector.

11. The apparatus according to claim 10, wherein the battery charger further includes an alignment mechanism that moves the charge connector in a direction that is orthogonal to the certain direction in order to align the charge connector with the battery connector.

* * * * *